US009564077B2

(12) United States Patent
Hung et al.

(10) Patent No.: US 9,564,077 B2
(45) Date of Patent: Feb. 7, 2017

(54) DISPLAY APPARATUS, DRIVING CHIP SET, AND OPERATING METHOD THEREOF

(71) Applicant: Dazzo Technology Corporation, Taipei (TW)

(72) Inventors: Chih-Jen Hung, Taipei (TW); Tsorng-Yang Mei, Taipei (TW); Chi-Te Lee, Taipei (TW)

(73) Assignee: DAZZO Technology Corporation, Taipei (TW)

( * ) Notice: Subject to any disclaimer, the term of this patent is extended or adjusted under 35 U.S.C. 154(b) by 171 days.

(21) Appl. No.: 14/065,378

(22) Filed: Oct. 28, 2013

(65) Prior Publication Data

US 2014/0118372 A1 May 1, 2014

(30) Foreign Application Priority Data

Oct. 29, 2012 (TW) ............................ 101139997 A

(51) Int. Cl.
*G06F 3/038* (2013.01)
*G09G 3/20* (2006.01)

(52) U.S. Cl.
CPC .... *G09G 3/2096* (2013.01); *G09G 2310/0221* (2013.01); *G09G 2310/0275* (2013.01); *G09G 2310/0297* (2013.01); *G09G 2330/021* (2013.01)

(58) Field of Classification Search
CPC .................. G09G 2310/0275; G09G 2370/08; G09G 2310/0221; G09G 2352/00; G09G 3/2096; G09G 3/3666
See application file for complete search history.

(56) References Cited

U.S. PATENT DOCUMENTS

| | | | |
|---|---|---|---|
| 7,773,048 B2 | 8/2010 | Shiraishi | |
| 8,300,033 B2 | 10/2012 | Nam et al. | |
| 2010/0302214 A1* | 12/2010 | Kim et al. | 345/204 |

FOREIGN PATENT DOCUMENTS

| | | |
|---|---|---|
| TW | 200615878 A | 5/2006 |
| TW | 200905636 A | 2/2009 |

OTHER PUBLICATIONS

Office action of counterpart application by Taiwan IP Office on Aug. 6, 2014.

* cited by examiner

*Primary Examiner* — Hau Nguyen

(57) ABSTRACT

A driving chip set includes a master chip and at least one slave chip. In the master chip, a master receiving terminal receives a data signal through a first data transmission interface; a processing unit generates a first partial data signal and a second partial data signal according to the data signal; a master buffer registers the first partial data signal; a master output terminal outputs the second partial data signal through a second data transmission interface. In the slave chip, a slave receiving terminal receives the second partial data signal through the second data transmission interface and it is registered by a slave buffer. The processing unit controls a master driver and a slave driver to output the first partial data signal and second partial data signal to a display panel. The display panel displays an image according to the first partial data signal and second partial data signal.

22 Claims, 7 Drawing Sheets

DISPLAY APPARATUS, DRIVING CHIP SET, AND OPERATING METHOD THEREOF

BACKGROUND OF THE INVENTION

1. Field of the Invention

The invention relates to a driving chip of a display apparatus; in particular, to a display apparatus, a driving chip set, and an operating method thereof capable of saving power, maintaining data signal quality, and simplifying circuit structure.

2. Description of the Prior Art

In recent years, the low-voltage differential signal (LVDS) interface has become a standard of interface data transmission between the image processing unit and the display unit in a notebook computer or a television. However, with the increasing size of the display and the rising demand of image display quality, if the LVDS interface is still used to transmit data, the following three problems will occur: (1) the increasing cost of cable because the LVDS interface needs more data transmission cables; (2) when more data transmission cables are needed, more pins of the image processing unit and transmitter are also needed to increase the cost of packaging; (3) dedicated clock line is needed for the LVDS interface, and higher data transmission rate will cause the offset of data and clock line to make long data signal transmission become more difficult.

In view of this, the LVDS interface is replaced by some signal transmission interfaces with higher data transmission rate and less signal transmission lines, such as an embedded display port (eDP) interface, a mobile industry processor interface (MIPI), or a V-by-One interface.

In a large-size display, the source driver usually uses a dual chip set to drive the left part and the right part of the display panel respectively. As shown in FIG. 1, if the display uses the eDP interface to transmit data signal, a first chip 11 and a second chip 12 of the dual chip set 1 have a first receiving terminal Rx1 and a second receiving terminal Rx2 respectively to receive the data signal eDP transmitted through the eDP interface. The control signal CS is transmitted between a first bus B1 of the first chip 11 and the second bus B2 of the second chip 12.

The largest problem of this structure is that the data transmission rate of the eDP interface is higher than the data transmission rate of the LVDS interface and the eDP interface has higher requirement of data signal quality, and the power consumption of the first receiving terminal Rx1 and the second receiving terminal Rx2 receiving data signal through the eDP interface is larger than the power consumption of the first receiving terminal Rx1 and the second receiving terminal Rx2 receiving data signal through the LVDS interface. And, the first receiving terminal Rx1 of the first chip 11 and the second receiving terminal Rx2 of the second chip 12 must be trained before they use the eDP interface to receive the data signal; therefore, its complexity and power consumption are both increased.

SUMMARY OF THE INVENTION

Therefore, the invention provides a display apparatus, a driving chip set, and an operating method thereof to solve the above-mentioned problems occurred in the prior arts.

An embodiment of the invention is a driving chip set. In this embodiment, the driving chip set is applied in a display apparatus including a display panel. The driving chip set is coupled to the display panel. The driving chip set includes a master chip and at least one slave chip. The master chip includes a master receiving terminal, a processing unit, a master buffer, a master driver, and a master output terminal. The master receiving terminal is used for receiving a data signal through a first data transmission interface. The processing unit is coupled to the master receiving terminal and used for generating a first partial data signal and a second partial data signal according to the data signal. The master buffer is coupled to the processing unit and used for receiving and registering the first partial data signal. The master driver is coupled to the master buffer. The master output terminal is coupled to the processing unit and used for outputting the second partial data signal through a second data transmission interface.

A first slave chip of the at least one slave chip includes a first slave receiving terminal, a first slave buffer, and a first slave driver. The first slave receiving terminal is coupled to the master output terminal and used for receiving the second partial data signal through the second data transmission interface. The first slave buffer is coupled to the first slave receiving terminal and used for receiving and registering the second partial data signal. The first slave driver is coupled to the first slave buffer. Wherein, the processing unit controls the master driver and the first slave driver to output the first partial data signal and the second partial data signal to the display panel respectively, and the display panel displays an image according to the first partial data signal and second partial data signal.

In an embodiment, the master receiving terminal receiving the data signal through the first data transmission interface consumes more power than the first slave receiving terminal receiving the second partial data signal through the second data transmission interface.

In an embodiment, the master buffer and the first slave buffer synchronously start to output the first partial data signal and the second partial data signal to the master driver and the first slave driver respectively.

In an embodiment, the first slave chip transmits a synchronous control signal to the master chip to make the master buffer and the first slave buffer synchronously start to output the first partial data signal and the second partial data signal to the master driver and the first slave driver respectively.

In an embodiment, the master driver and the first slave driver are source drivers of the display apparatus.

In an embodiment, the first data transmission interface is an embedded display port (eDP) interface, a mobile industry processor interface (MIPI), or a V-by-One interface.

In an embodiment, the second data transmission interface is a low-voltage differential signal (LVDS) interface or a mini low-voltage differential signal (Mini-LVDS) interface.

In an embodiment, the first slave chip further includes a first slave output terminal used for outputting a third partial data signal from the first slave receiving terminal to a second slave chip of the at least one slave chip through the second data transmission interface, and the third partial data signal is a part of the second partial data signal.

In an embodiment, the second slave chip includes a second slave receiving terminal, a second slave buffer, and a second slave driver. The second slave receiving terminal is coupled to the first slave output terminal and used for receiving the third partial data signal through the second data transmission interface. The second slave buffer is coupled to the second slave receiving terminal and used for receiving and registering the third partial data signal. The second slave driver is coupled to the second slave buffer. The second slave receiving terminal receiving the third partial data signal through the second data transmission interface consumes less power than the master receiving terminal receiving the data signal through the first data transmission interface, the master buffer, the first slave buffer, and the second slave buffer synchronously start to output the first partial data signal, the second partial data signal, and the third partial data signal to the master driver, the first slave driver, and the second slave driver respectively.

In an embodiment, the second slave chip transmits a synchronous control signal to the first slave chip and the master chip to make the master buffer, the first slave buffer, and the second slave buffer synchronously start to output the first partial data signal, the second partial data signal, and the third partial data signal to the master driver, the first slave driver, and the second slave driver respectively.

Another embodiment of the invention is a display apparatus. In this embodiment, the display apparatus includes a display panel and a driving chip set. The driving chip set is coupled to the display panel and outputs a driving control signal to the display panel. The driving chip set includes a master chip and at least one slave chip. The master chip includes a master receiving terminal, a processing unit, a master buffer, a master driver, and a master output terminal. The master receiving terminal is used for receiving a data signal through a first data transmission interface. The processing unit is coupled to the master receiving terminal and used for generating a first partial data signal and a second partial data signal according to the data signal. The master buffer is coupled to the processing unit and used for receiving and registering the first partial data signal. The master driver is coupled to the master buffer and a first partial region of the display panel. The master output terminal is coupled to the processing unit and used for outputting the second partial data signal through a second data transmission interface.

A first slave chip of the at least one slave chip includes a first slave receiving terminal, a first slave buffer, and a first slave driver. The first slave receiving terminal is coupled to the master output terminal and used for receiving the second partial data signal through the second data transmission interface. The first slave buffer is coupled to the first slave receiving terminal and used for receiving and registering the second partial data signal. The first slave driver is coupled to the first slave buffer and a second partial region of the display panel. Wherein, the processing unit controls the master driver and the first slave driver to output the first partial data signal and the second partial data signal to the display panel respectively, and the display panel displays an image according to the first partial data signal and second partial data signal.

Another embodiment of the invention is a driving chip set operating method. In this embodiment, the driving chip set operating method is applied in a driving chip set of a display apparatus. The driving chip set includes a master chip and at least one slave chip. The driving chip set operating method includes steps of: the master chip receiving a data signal through a first data transmission interface and generating a first partial data signal and a second partial data signal according to the data signal; the master chip registering the first partial data signal and outputting the second partial data signal through a second data transmission interface; a first slave chip of the at least one slave chip receiving the second partial data signal through the second data transmission interface and registering the second partial data signal; the master chip and the first slave chip starting to output the first partial data signal and the second partial data signal to a master driver of the master chip and a first slave driver of the first slave chip respectively.

Compared to the prior art, the display apparatus, the driving chip set, and the operating method thereof in the invention use the master chip to receive the signal of the first data transmission interface (e.g., the eDP interface) and uses the second data transmission interface (e.g., the Mini-LVDS interface) consuming less power to transmit half of the image data to the slave chip. Therefore, the display apparatus, the driving chip set, and the operating method thereof in the invention have following advantages.

(1) In the driving chip set of the invention, only the master chip uses its master receiving terminal to receive the data signal of the first data transmission interface; therefore, the driving chip set of the invention can save more power than the driving chip set of the prior art and have better data signal quality than the driving chip set of the prior art since the master receiving terminal and the slave receiving terminal of the invention will not receive the data signal of the first data transmission interface at the same time.

(2) In the driving chip set of the invention, since the main functions are processed by the master chip, there will be less data transmission between the master chip and the slave chip and only basic synchronous function is necessary between them. Therefore, the complexity of the circuit design can be reduced.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
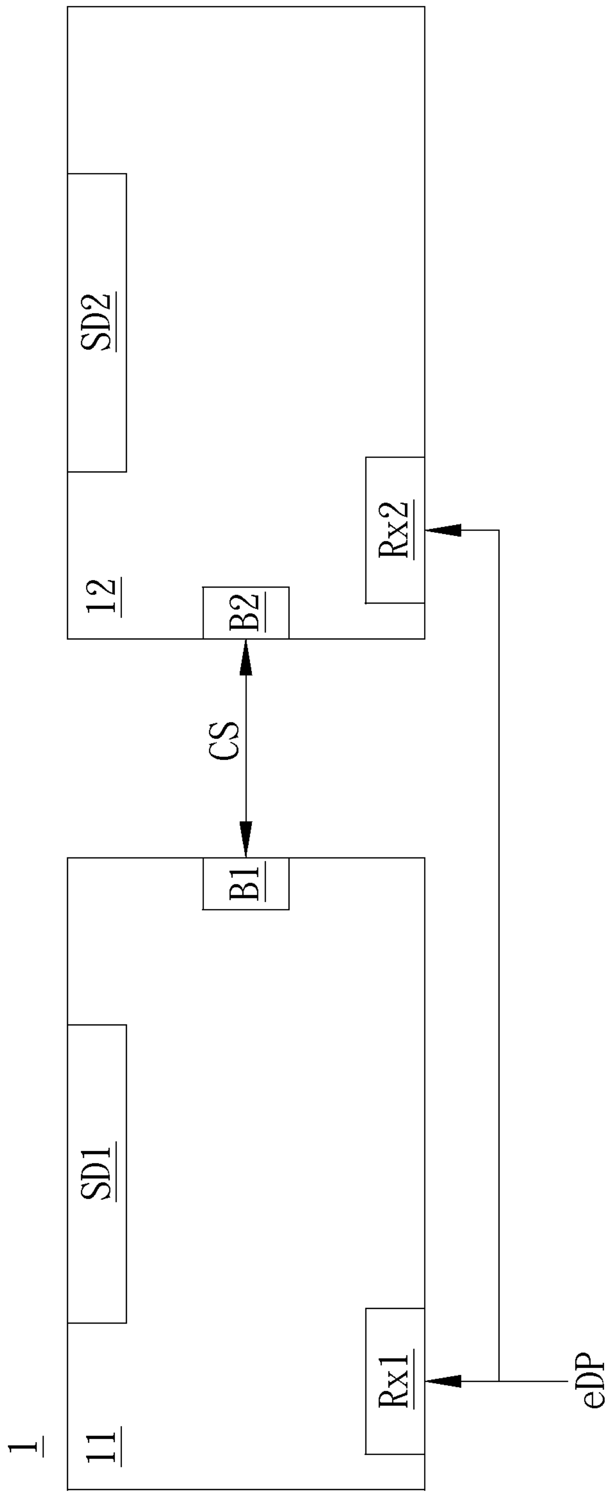
FIG. 1 (PRIOR ART)
FIG. 1 illustrates a schematic diagram of the conventional source driving dual chip set.
Figure 2:
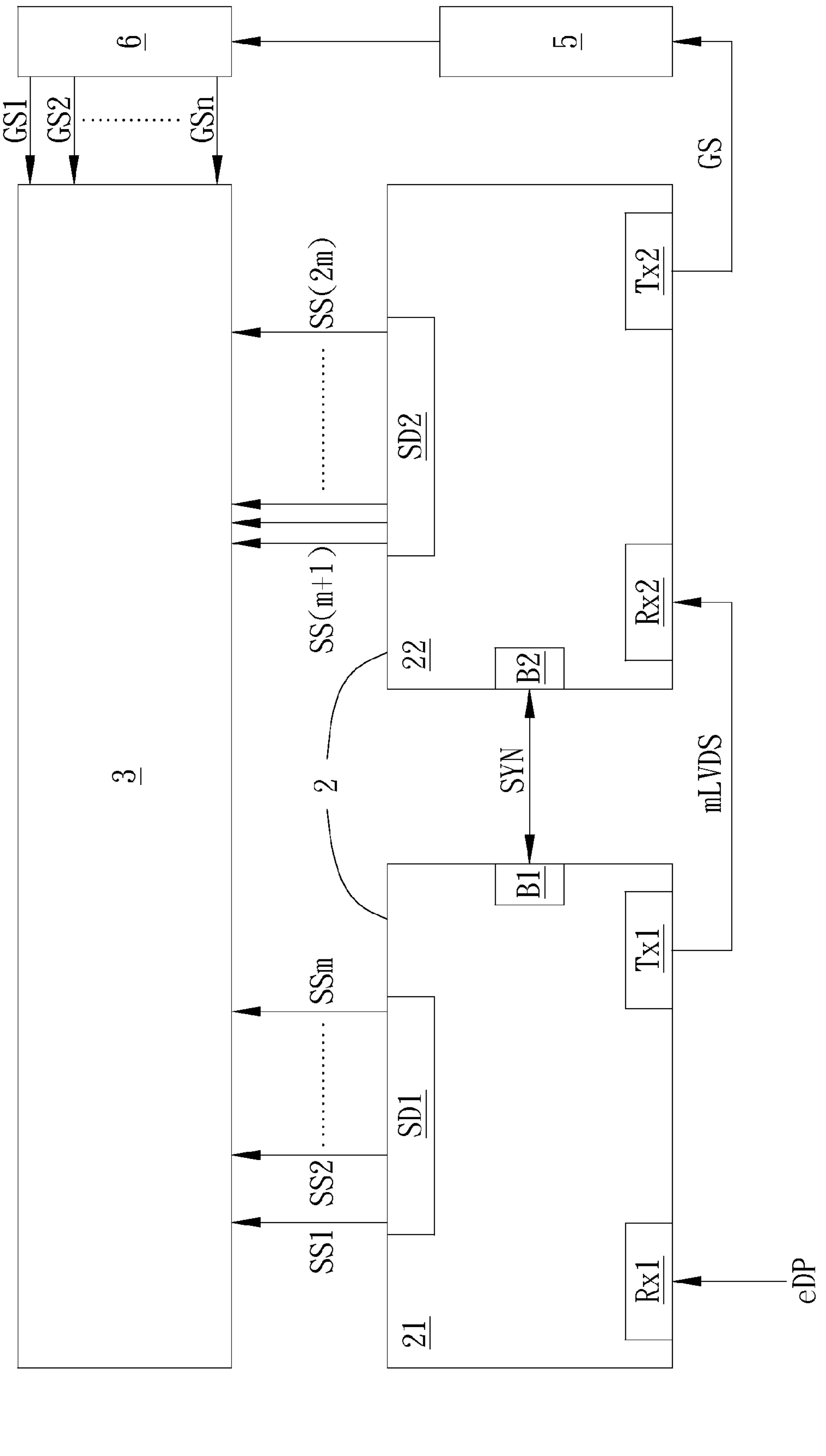
FIG. 2 illustrates a schematic diagram of a display apparatus having a source driving dual chip set in an embodiment of the invention.

An embodiment of the invention is a display apparatus. In this embodiment, the display apparatus is a liquid crystal display. As shown in FIG. 2, the display apparatus at least includes a source driving chip set 2, a display panel 3, a level shifter 5, and a gate driving chip 6. The source driving chip set 2 and the gate driving chip 6 are both coupled to the display panel 3 and used to output source driving control signals SS1~SS(2*m*) and gate driving control signals GS1~GSn to the display panel 3 respectively, wherein m and n are positive integers. The level shifter 5 is coupled between the source driving chip set 2 and the gate driving chip 6 and used to shift the gate driving control signal GS outputted by the source driving chip set 2 to the high-voltage gate driving control signals GS1~GSn.

Figure 3A:
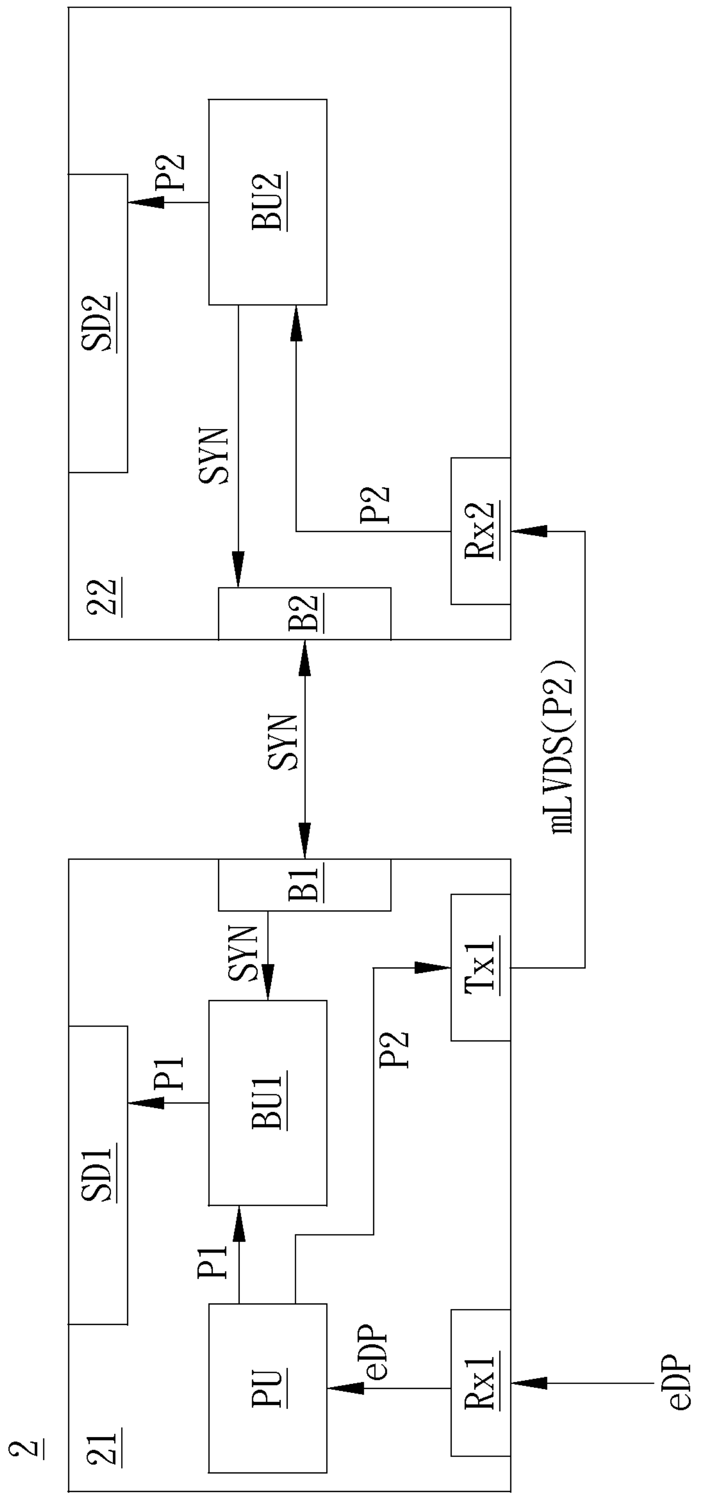
FIG. 3A and FIG. 3B illustrate function block diagrams of the source driving dual chip sets in different embodiments.
Figure 3B:
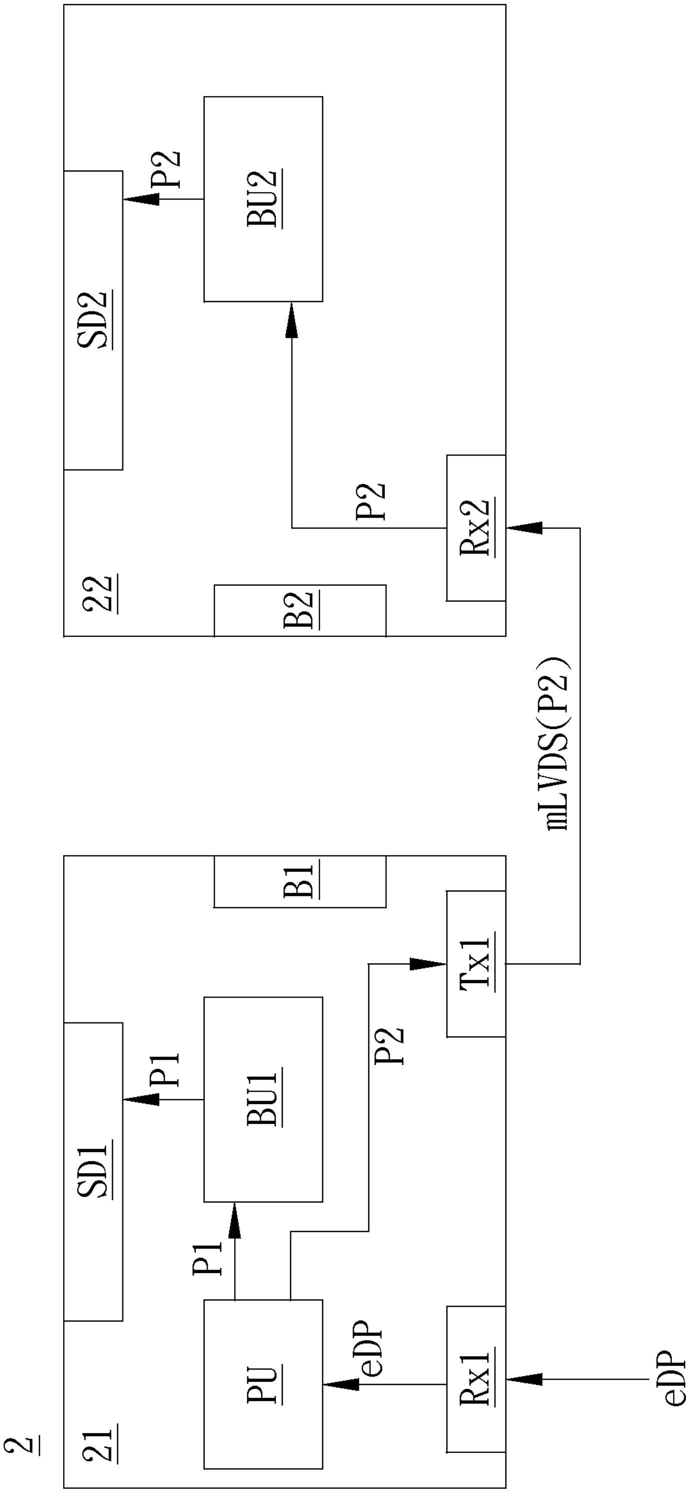

Please refer to FIG. 2 and FIG. 3A. The source driving chip set 2 includes a master chip 21 and a slave chip 22. Wherein, the master chip 21 includes a master receiving terminal Rx1, a processing unit PU, a master buffer BU1, a master driver SD1, a master output terminal Tx1, and a master bus B1. The processing unit PU is coupled to the master receiving terminal Rx1, the master buffer BU1, and the master output terminal Tx1; the master buffer BU1 is coupled to the master driver SD1 and the master bus B1; the master driver SD1 is coupled to the display panel 3.

The slave chip 22 includes a slave receiving terminal Rx2, a slave buffer BU2, a slave driver SD2, and a slave bus B2. The slave receiving terminal Rx2 is coupled to the slave buffer BU2 and the master output terminal Tx1 of the master chip 21 respectively; the slave buffer BU2 is coupled to the slave driver SD2 and the slave bus B2 respectively; the slave bus B2 is coupled to the master bus B1 of the master chip 21; the slave driver SD2 is coupled to the display panel 3.

In the master chip 21, the master receiving terminal Rx1 is used to receive a data signal eDP through a first data transmission interface. In fact, the first data transmission interface can be a data transmission interface with higher data transmission rate and more power consumption, such as an embedded display port (eDP) interface, a mobile industry processor interface (MIPI), or a V-by-One interface, but not limited to this.

Then, the processing unit PU receives the data signal eDP from the master receiving terminal Rx1 and generates a first partial data signal P1 and a second partial data signal P2 according to the data signal eDP. For example, the processing unit PU can divide the data signal eDP into a left-half data signal and a right-half data signal, but not limited to this.

The processing unit PU outputs the first partial data signal P1 and the second partial data signal P2 to the master buffer BU1 and the master output terminal Tx1 respectively. When the master buffer BU1 receives the first partial data signal P1, the master buffer BU1 will register the first partial data signal P1. When the master output terminal Tx1 receives the second partial data signal P2, the output terminal Tx1 will output the second partial data signal P2 to the slave chip 22 through a second data transmission interface.

In fact, the second data transmission interface can be a power-saving data transmission interface, such as a low-voltage differential signal (LVDS) interface or a mini low-voltage differential signal (Mini-LVDS) interface, but not limited to this. From above, it can be found that the master receiving terminal Rx1 receiving the data signal through the first data transmission interface consumes more power than the first slave receiving terminal Rx2 receiving the second partial data signal through the second data transmission interface.

When the slave receiving terminal Rx2 of the slave chip 22 receives a mini low-voltage differential signal mLVDS including the second partial data signal P2 through the second data transmission interface, the slave receiving terminal Rx2 will transmit the second partial data signal P2 to the slave buffer BU2 and the slave buffer BU2 will register the second partial data signal P2. Once the slave buffer BU2 receives the second partial data signal P2, it means that the slave buffer BU2 of the slave chip 22 and the master buffer BU1 of the master chip 21 have registered the second partial data signal P2 and the first partial data signal P1 respectively. Therefore, the slave buffer BU2 can output a synchronous control signal SYN to the master bus B1 of the master chip 21 through the slave bus B2, and the slave bus B2 transmits the synchronous control signal SYN to the master buffer BU1 to inform the master buffer BU1 the information of the second partial data signal P2 received by the slave buffer BU2, so that the master buffer BU1 and the slave buffer BU2 can synchronously start to output the first partial data signal P1 and the second partial data signal P2 to the master driver SD1 and the slave driver SD2 respectively. Therefore, the goal of synchronously outputting corresponding parts of data signal to different parts of the source driver can be achieved.

It should be noticed that the master buffer BU1 and the slave buffer BU2 can synchronously start to output the first partial data signal P1 and the second partial data signal P2 respectively by not only the way of transmitting the synchronous control signal SYN to inform the master buffer BU1 shown in FIG. 3A, but also the way of the master buffer BU1 delaying a specific period of time after receiving the first partial data signal P1 to output together with the slave buffer BU2 receiving the second partial data signal P2 later.

Afterwards, the processing unit PU will control the master driver SD1 and the slave driver SD2 to output the first partial data signal P1 and the second partial data signal P2 to the display panel 3 respectively, and the display panel 3 will display an image according to the first partial data signal P1 and the second partial data signal P2.

In another embodiment, the source driving chip set 4 includes a master chip 41, a first slave chip 42, and a second slave chip 43. Wherein, the master chip 41 includes a master receiving terminal Rx1, a processing unit PU, a master buffer BU1, a master driver SD1, a master output terminal Tx1, and a master bus B1. The processing unit PU is coupled to the master receiving terminal Rx1, the master buffer BU1, and the master output terminal Tx1; the master buffer BU1 is coupled to the master driver SD1 and the master bus B1.

The first slave chip 42 includes a first slave receiving terminal Rx2, a first slave buffer BU2, a first slave driver SD2, a first slave output terminal Tx2, and a first slave bus B2. The first slave receiving terminal Rx2 is coupled to the first slave buffer BU2, the first slave output terminal Tx2, and the master output terminal Tx1 of the master chip 41 respectively; the first slave buffer BU2 is coupled to the first slave driver SD2 and the first slave bus B2 respectively.

The second slave chip 43 includes a second slave receiving terminal Rx3, a second slave buffer BU3, a second slave driver SD3, and a second slave bus B3. The second slave receiving terminal Rx3 is coupled to the second slave buffer BU3 and the first slave output terminal Tx2 of the first slave chip 42 respectively; the second slave buffer BU3 is coupled to the second slave driver SD3 and the second slave bus B3 respectively.

In the master chip 41, the master receiving terminal Rx1 is used to receive a data signal eDP through a first data transmission interface. In fact, the first data transmission interface can be a data transmission interface with higher data transmission rate and more power consumption, such as an embedded display port (eDP) interface, a mobile industry processor interface (MIPI), or a V-by-One interface, but not limited to this.

Then, the processing unit PU receives the data signal eDP from the master receiving terminal Rx1 and generates a first partial data signal P1, a second partial data signal P2, and a third partial data signal P3 according to the data signal eDP. For example, the processing unit PU can divide the data signal eDP into a left part data signal, a middle part data signal, and a right part data signal, but not limited to this.

The processing unit PU outputs the first partial data signal P1 to the master buffer BU1, and the processing unit PU outputs the second partial data signal P2 and the third partial data signal P3 to the master output terminal Tx1. When the master buffer BU1 receives the first partial data signal P1, the master buffer BU1 will register the first partial data signal P1. When the master output terminal Tx1 receives the second partial data signal P2 and the third partial data signal P3, the master output terminal Tx1 will output the second partial data signal P2 and the third partial data signal P3 to the first slave chip 42 through a second data transmission interface.

In fact, the second data transmission interface can be a power-saving data transmission interface, such as a low-voltage differential signal (LVDS) interface or a mini low-voltage differential signal (Mini-LVDS) interface, but not limited to this. From above, it can be found that the master receiving terminal Rx1 receiving the data signal through the first data transmission interface consumes more power than the first slave receiving terminal Rx2 receiving the data signal through the second data transmission interface.

When the first slave receiving terminal Rx2 of the first slave chip 42 receives a first mini low-voltage differential signal mLVDS1 including the second partial data signal P2 and the third partial data signal P3 through the second data transmission interface, the first slave receiving terminal Rx2 will transmit the second partial data signal P2 to the first slave buffer BU2 and the first slave buffer BU2 will register the second partial data signal P2. The first slave receiving terminal Rx2 will transmit the third partial data signal P3 to the first slave output terminal Tx2, and the first slave output terminal Tx2 will output a second mini low-voltage differential signal mLVDS2 including the third partial data signal P3 to the second slave chip 43 through the second data transmission interface.

When the second slave receiving terminal Rx3 of the second slave chip 43 receives the second mini low-voltage differential signal mLVDS2 including the third partial data signal P3 through the second data transmission interface, the second slave receiving terminal Rx3 will transmit the third partial data signal P3 to the second slave buffer BU3 and the second slave buffer BU3 will register the third partial data signal P3.

Once the second slave buffer BU3 receives the third partial data signal P3, it means that the second slave buffer BU3 of the second slave chip 43, the first slave buffer BU2 of the first slave chip 42, and the master buffer BU1 of the master chip 41 have registered the third partial data signal P3, the second partial data signal P2, and the first partial data signal P1 respectively. Therefore, the second slave buffer BU3 can output a synchronous control signal SYN to the first master bus B2 of the first slave chip 42 and the master bus B1 of the master chip 41 through the second slave bus B3, and the first slave bus B2 and the master bus B1 transmit the synchronous control signal SYN to the first slave buffer BU2 and the master buffer BU1 to inform the master buffer BU1 the information of the third partial data signal P3 received by the second slave buffer BU3, so that the master buffer BU1, the first slave buffer BU2, and the second slave buffer BU3 can synchronously start to output the first partial data signal P1, the second partial data signal P2, the third partial data signal P3 to the master driver SD1, the first slave driver SD2, and the second slave driver SD3 respectively. Therefore, the goal of synchronously outputting corresponding parts of data signal to different parts of the source driver can be achieved.

Figure 4:
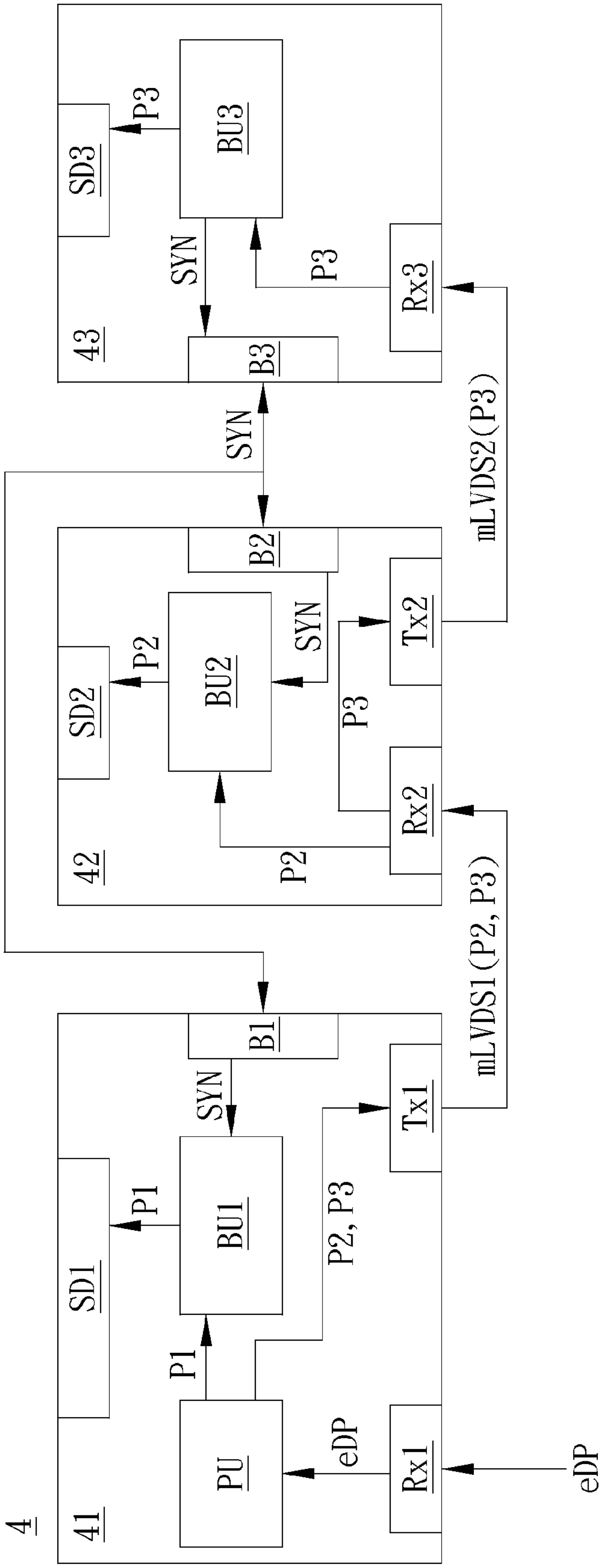
FIG. 4 illustrates a schematic diagram of a source driving triple chip set in an embodiment of the invention.

It should be noticed that the master buffer BU1, the first slave buffer BU2, and the second slave buffer BU3 can synchronously start to output the first partial data signal P1, the second partial data signal P2, and the third partial data signal P3 respectively by not only the way of transmitting the synchronous control signal SYN to inform the master buffer BU1 shown in FIG. 4, but also the way of the master buffer BU1 delaying a first specific period of time after receiving the first partial data signal P1 and the first slave buffer BU2 delaying a second specific period of time after receiving the second partial data signal P2 to output together with the second slave buffer BU3 receiving the third partial data signal P3 later.

Figure 5:
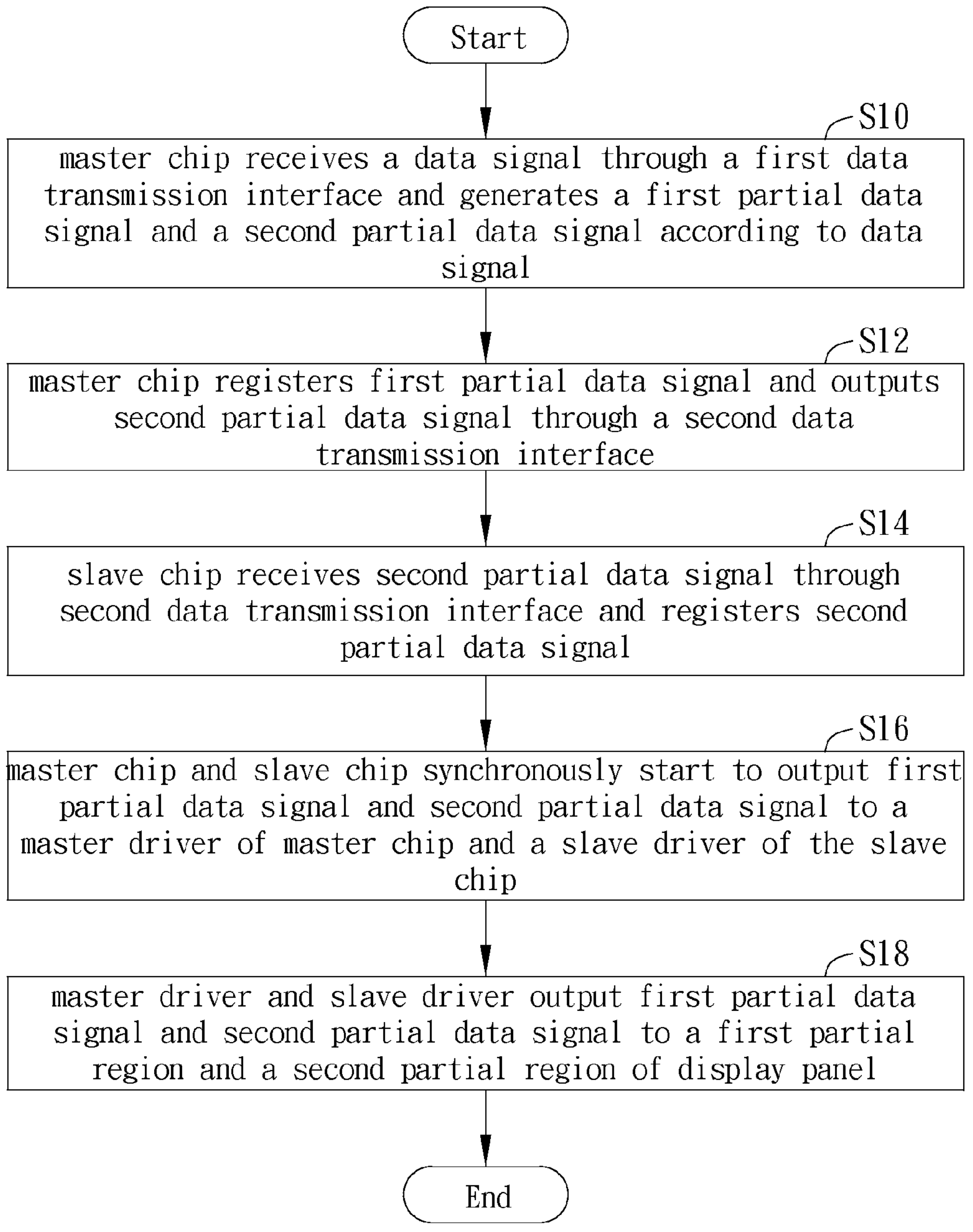
FIG. 5 illustrates a flow chart of the driving chip set operating method in another embodiment of the invention.

Another embodiment of the invention is a driving chip set operating method. In this embodiment, the driving chip set operating method is applied in a source driving chip set of a display apparatus. The driving chip set includes a master chip and a slave chip. Please refer to FIG. 5. FIG. 5 illustrates a flow chart of the driving chip set operating method in this embodiment.

As shown in FIG. 5, in the step S10, the master chip receives a data signal through a first data transmission interface and generates a first partial data signal and a second partial data signal according to the data signal. In fact, the first data transmission interface can be a data transmission interface with higher data transmission rate and more power consumption, such as an embedded display port (eDP) interface, a mobile industry processor interface (MIPI), or a V-by-One interface, but not limited to this.

In the step S12, the master chip registers the first partial data signal and outputs the second partial data signal through a second data transmission interface. In fact, the second data transmission interface can be a power-saving data transmission interface, such as a low-voltage differential signal (LVDS) interface or a mini low-voltage differential signal (Mini-LVDS) interface, but not limited to this. From above, it can be found that the master receiving terminal receiving the data signal through the first data transmission interface consumes more power than the first slave receiving terminal receiving the data signal through the second data transmission interface.

Then, in the step S14, the slave chip receives the second partial data signal through the second data transmission interface and registers the second partial data signal. In the step S16, the master chip and the slave chip synchronously start to output the first partial data signal and the second partial data signal to a master driver of the master chip and a slave driver of the slave chip respectively. It should be noticed that the master chip and the slave chip can synchronously start to output the first partial data signal and the second partial data signal respectively by not only the way of transmitting the synchronous control signal to inform the master chip, but also the way of the master chip delaying a known period of delay time after receiving the first partial data signal to output together with the slave chip receiving the second partial data signal later.

Afterwards, in the step S18, the master driver and the slave driver output the first partial data signal and the second partial data signal to a first partial region and a second partial region of the display panel respectively. For example, the master driver and the slave driver can output a left-half data signal and a right-half data signal to a left-half partial region and a right-half partial region of the display panel respectively, but not limited to this.

Figure 6:
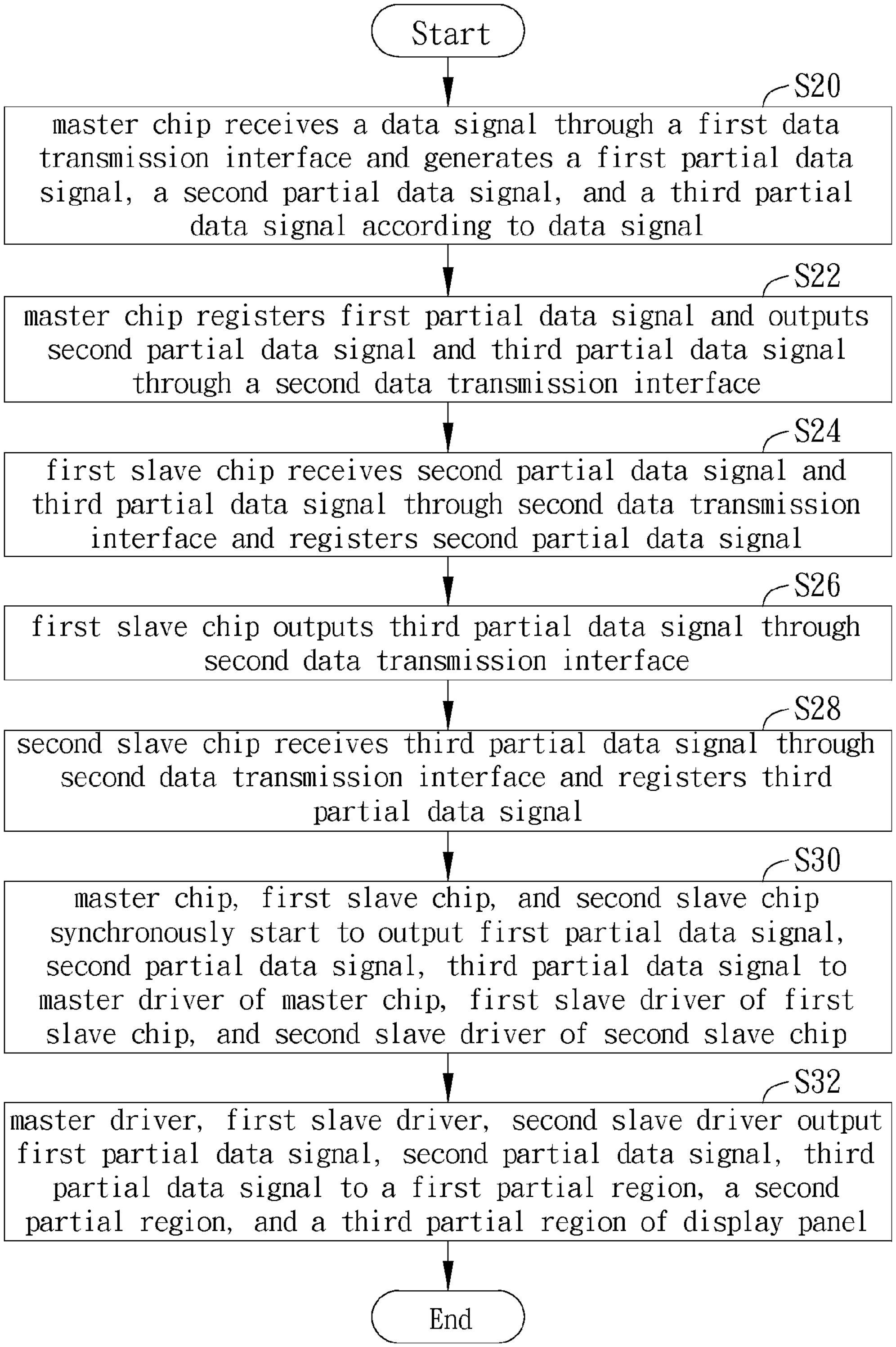
FIG. 6 illustrates a flow chart of the driving chip set operating method in another embodiment of the invention.

In another embodiment, the driving chip set includes a master chip and a plurality of slave chips, such as a first slave chip and a second slave chip. Please refer to FIG. 6. FIG. 6 illustrates a flow chart of the driving chip set operating method in this embodiment.

As shown in FIG. 6, in the step S20, the master chip receives a data signal through a first data transmission interface and generates a first partial data signal, a second partial data signal, and a third partial data signal according to the data signal. In fact, the first data transmission interface can be a data transmission interface with higher data transmission rate and more power consumption, such as an embedded display port (eDP) interface, a mobile industry processor interface (MIPI), or a V-by-One interface, but not limited to this.

In the step S22, the master chip registers the first partial data signal and outputs the second partial data signal and the third partial data signal through a second data transmission interface. In fact, the second data transmission interface can be a power-saving data transmission interface, such as a low-voltage differential signal (LVDS) interface or a mini low-voltage differential signal (Mini-LVDS) interface, but not limited to this. From above, it can be found that the master receiving terminal receiving the data signal through the first data transmission interface consumes more power than the first slave receiving terminal receiving the data signal through the second data transmission interface.

Then, in the step S24, the first slave chip receives the second partial data signal and the third partial data signal through the second data transmission interface and registers the second partial data signal. In the step S26, the first slave chip outputs the third partial data signal through the second data transmission interface. In the step S28, the second slave chip receives the third partial data signal through the second data transmission interface and registers the third partial data signal. From above, it can be found that the master receiving terminal receiving the data signal through the first data transmission interface consumes more power than the first slave receiving terminal and the second slave receiving terminal receiving the data signal through the second data transmission interface.

In the step S30, the master chip, the first slave chip, and the second slave chip synchronously start to output the first partial data signal, the second partial data signal, the third partial data signal to the master driver of the master chip, the first slave driver of the first slave chip, and the second slave driver of the second slave chip respectively. It should be noticed that the master chip, the first slave chip, and the second slave chip can synchronously start to output the first partial data signal and the second partial data signal respectively by not only the way of the second slave chip transmitting the synchronous control signal to inform the master chip and the first slave chip, but also the way of the master chip delaying a first known period of delay time after receiving the first partial data signal and the first slave chip delaying a second known period of delay time after receiving the second partial data signal to output together with the second slave chip receiving the third partial data signal later.

Afterwards, in the step S32, the master driver, the first slave driver, and the second slave driver output the first partial data signal, the second partial data signal, the third partial data signal to a first partial region, a second partial region, and a third partial region of the display panel respectively.

Compared to the prior art, the display apparatus, the driving chip set, and the operating method thereof in the invention use the master chip to receive the signal of the first data transmission interface (e.g., the eDP interface) and uses the second data transmission interface (e.g., the Mini-LVDS interface) consuming less power to transmit half of the image data to the slave chip. Therefore, the display apparatus, the driving chip set, and the operating method thereof in the invention have following advantages.

(1) In the driving chip set of the invention, only the master chip uses its master receiving terminal to receive the data signal of the first data transmission interface; therefore, the driving chip set of the invention can save more power than the driving chip set of the prior art and have better data signal quality than the driving chip set of the prior art since the master receiving terminal and the slave receiving terminal of the invention will not receive the data signal of the first data transmission interface at the same time.

(2) In the driving chip set of the invention, since the main functions are processed by the master chip, there will be less data transmission between the master chip and the slave chip and only basic synchronous function is necessary between them. Therefore, the complexity of the circuit design can be reduced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A driving chip set, applied in a display apparatus comprising a display panel, the driving chip set being coupled to the display panel, the driving chip set comprising:

a master chip, comprising:

a master receiving terminal, for receiving a data signal through a first data transmission interface;

a processor, coupled to the master receiving terminal, for generating a first partial data signal and a second partial data signal according to the data signal;

a master buffer, coupled to the processor, for receiving and registering the first partial data signal;

a master driver, coupled to the master buffer; and a master output terminal, coupled to the processor, the master output terminal outputs the second partial data signal through a second data transmission interface; and at least one slave chip, a first slave chip of the at least one slave chip comprising:

a first slave receiving terminal, coupled to the master output terminal, the first slave receiving terminal receives the second partial data signal through the second data transmission interface;

a first slave buffer, coupled to the first slave receiving terminal, the first slave buffer directly receives the second partial data signal from the first slave receiving terminal without any further processing of the second partial data signal and registers the second partial data signal; and a first slave driver, coupled to the first slave buffer;

wherein the processor, according to a synchronous control signal, controls the master buffer and the first slave buffer synchronously to start to output the first partial data signal and the second partial data signal to the master driver and the first slave driver respectively in order to make the master driver and the first slave driver to output the first partial data signal and the second partial data signal to the display panel respectively, the master receiving terminal receiving the data signal through the first data transmission interface consumes more power than the first slave receiving terminal receiving the second partial data signal through the second data transmission interface, and the display panel displays an image according to the first partial data signal and second partial data signal.

2. The driving chip set of claim 1, wherein the first slave chip transmits the synchronous control signal to the master chip.

3. The driving chip set of claim 1, wherein the master driver and the first slave driver are source drivers of the display apparatus.

4. The driving chip set of claim 1, wherein the first data transmission interface is an embedded display port (eDP) interface, a mobile industry processor interface (MIPI), or a V-by-One interface.

5. The driving chip set of claim 1, wherein the second data transmission interface is a low-voltage differential signal (LVDS) interface or a mini low-voltage differential signal (Mini-LVDS) interface.

6. The driving chip set of claim 1, wherein the first slave chip further comprises a first slave output terminal used for outputting a third partial data signal from the first slave receiving terminal to a second slave chip of the at least one slave chip through the second data transmission interface, and the third partial data signal is a part of the second partial data signal.

7. The driving chip set of claim 6, wherein the second slave chip comprises:

a second slave receiving terminal, coupled to the first slave output terminal, for receiving the third partial data signal through the second data transmission interface;

a second slave buffer, coupled to the second slave receiving terminal, for receiving and registering the third partial data signal; and a second slave driver, coupled to the second slave buffer;

wherein the second slave receiving terminal receiving the third partial data signal through the second data transmission interface consumes less power than the master receiving terminal receiving the data signal through the first data transmission interface, the master buffer, the first slave buffer, and the second slave buffer synchronously start to output the first partial data signal, the second partial data signal, and the third partial data signal to the master driver, the first slave driver, and the second slave driver respectively.

8. The driving chip set of claim 7, wherein the second slave chip transmits a synchronous control signal to the first slave chip and the master chip to make the master buffer, the first slave buffer, and the second slave buffer synchronously start to output the first partial data signal, the second partial data signal, and the third partial data signal to the master driver, the first slave driver, and the second slave driver respectively.

9. A display apparatus, comprising:

a display panel; and a driving chip set, coupled to the display panel and outputting a driving control signal to the display panel, the driving chip set comprising:

a master chip, comprising:

a master receiving terminal, for receiving a data signal through a first data transmission interface;

a processor, coupled to the master receiving terminal, for generating a first partial data signal and a second partial data signal according to the data signal;

a master buffer, coupled to the processor, for receiving and registering the first partial data signal;

a master driver, coupled to the master buffer and a first partial region of the display panel; and a master output terminal, coupled to the processor, the master output terminal outputs the second partial data signal through a second data transmission interface; and at least one slave chip, a first slave chip of the at least one slave chip comprising:

a first slave receiving terminal, coupled to the master output terminal, the first slave receiving terminal receives the second partial data signal through the second data transmission interface;

a first slave buffer, coupled to the first slave receiving terminal, the first slave buffer directly receives the second partial data signal from the first slave receiving terminal without any further processing of the second partial data signal and registers the second partial data signal; and a first slave driver, coupled to the first slave buffer and a second partial region of the display panel;

wherein the processor, according to a synchronous control signal, controls the master buffer and the first slave buffer synchronously to start to output the first partial data signal and the second partial data signal to the master driver and the first slave driver respectively in order to make the master driver and the first slave driver to output the first partial data signal and the second partial data signal to the display panel respectively, the master receiving terminal receiving the data signal through the first data transmission interface consumes more power than the first slave receiving terminal receiving the second partial data signal through the second data transmission interface, and the display panel displays an image according to the first partial data signal and second partial data signal.

10. The display apparatus of claim 9, wherein the first slave chip transmits a synchronous control signal to the master chip.

11. The display apparatus of claim 9, wherein the first data transmission interface is an embedded display port (eDP) interface, a mobile industry processor interface (MIPI), or a V-by-One interface.

12. The display apparatus of claim 9, wherein the second data transmission interface is a low-voltage differential signal (LVDS) interface or a mini low-voltage differential signal (Mini-LVDS) interface.

13. The display apparatus of claim 9, wherein the first slave chip further comprises a first slave output terminal used for outputting a third partial data signal from the first slave receiving terminal to a second slave chip of the at least one slave chip through the second data transmission interface, and the third partial data signal is a part of the second partial data signal.

14. The display apparatus of claim 13, wherein the second slave chip comprises:

a second slave receiving terminal, coupled to the first slave output terminal, for receiving the third partial data signal through the second data transmission interface;

a second slave buffer, coupled to the second slave receiving terminal, for receiving and registering the third partial data signal; and a second slave driver, coupled to the second slave buffer and a third partial region of the display panel;

wherein the second slave receiving terminal receiving the third partial data signal through the second data transmission interface consumes less power than the master receiving terminal receiving the data signal through the first data transmission interface, the master buffer, the first slave buffer, and the second slave buffer synchronously start to output the first partial data signal, the second partial data signal, and the third partial data signal to the master driver, the first slave driver, and the second slave driver respectively, and then the master driver, the first slave driver, and the second slave driver output the first partial data signal, the second partial data signal, and the third partial data signal to the first partial region, the second partial region, and the third partial region of the display panel respectively.

15. The display apparatus of claim 14, wherein the second slave chip transmits the synchronous control signal to the first slave chip and the master chip to make the master buffer, the first slave buffer, and the second slave buffer synchronously start to output the first partial data signal, the second partial data signal, and the third partial data signal to the master driver, the first slave driver, and the second slave driver respectively.

16. A driving chip set operating method, applied in a driving chip set of a display apparatus, the driving chip set comprising a master chip and at least one slave chip, the driving chip set operating method comprising steps of:

the master chip receiving a data signal through a first data transmission interface and generating a first partial data signal and a second partial data signal according to the data signal;

the master chip registering the first partial data signal and outputting the second partial data signal through a second data transmission interface;

a first slave chip of the at least one slave chip directly receiving the second partial data signal from the master chip through the second data transmission interface and registering the second partial data signal; and the master chip, according to a synchronous control signal, controlling the master chip and the first slave chip to synchronously start to output the first partial data signal and the second partial data signal to a master driver of the master chip and a first slave driver of the first slave chip respectively, wherein the master chip receiving the data signal through the first data transmission interface consumes more power than the first slave chip receiving the second partial data signal through the second data transmission interface.

17. The driving chip set operating method of claim 16, further comprising steps of:

the first slave chip transmitting the synchronous control signal to the master chip.

18. The driving chip set operating method of claim 16, further comprising step of:

the first slave chip outputting a third partial data signal to a second slave chip of the at least one slave chip through the second data transmission interface, wherein the third partial data signal is a part of the second partial data signal.

19. The driving chip set operating method of claim 18, further comprising steps of:

the second slave chip receiving the third partial data signal through the second data transmission interface and registering the third partial data signal, wherein the second slave chip receiving the third partial data signal through the second data transmission interface consumes less power than the master chip receiving the data signal through the first data transmission interface; and the master buffer, the first slave buffer, and the second slave buffer synchronously starting to output the first partial data signal, the second partial data signal, and the third partial data signal to the master driver, the first slave driver, and the second slave driver respectively.

20. The driving chip set operating method of claim 19, further comprising step of:

the second slave chip transmitting the synchronous control signal to the first slave chip and the master chip before the master buffer, the first slave buffer, and the second slave buffer synchronously start to output the first partial data signal, the second partial data signal, and the third partial data signal to the master driver, the first slave driver, and the second slave driver respectively.

21. A driving chip set, applied in a display apparatus comprising a display panel, the driving chip set being coupled to the display panel, the driving chip set comprising:

a master chip, comprising:

a master receiving terminal, for receiving a data signal through a first data transmission interface;

a processor, coupled to the master receiving terminal, for generating a first partial data signal and a second partial data signal according to the data signal;

a master buffer, coupled to the processor, for receiving and registering the first partial data signal;

a master driver, coupled to the master buffer; and a master output terminal, coupled to the processor, the master output terminal outputs the second partial data signal through a second data transmission interface; and at least one slave chip, a first slave chip of the at least one slave chip comprising:

a first slave receiving terminal, coupled to the master output terminal, the first slave receiving terminal receives the second partial data signal through the second data transmission interface;

a first slave buffer, coupled to the first slave receiving terminal, the first slave buffer directly receives the second partial data signal from the first slave receiving terminal without any further processing of the second partial data signal and registers the second partial data signal; and a first slave driver, coupled to the first slave buffer;

wherein the processor, according to a synchronous control signal, controls the master buffer and the first slave buffer synchronously to start to output the first partial data signal and the second partial data signal to the master driver and the first slave driver respectively in order to make the master driver and the first slave driver to output the first partial data signal and the second partial data signal to the display panel respectively, a data transmission rate of the first data transmission interface is higher than the data transmission rate of the second data transmission interface, and the display panel displays an image according to the first partial data signal and the second partial data signal.

22. The driving chip set of claim 21, wherein the first data transmission interface includes higher data transmission rates of embedded display port, mobile industry processor interface, or V-by-One interfaces.

* * * * *